(12) United States Patent
Ahn et al.

(10) Patent No.: US 9,242,414 B2
(45) Date of Patent: Jan. 26, 2016

(54) DELAMINATION APPARATUS AND INLINE THERMAL IMAGING SYSTEM

(71) Applicants: Kyung-Hyun Ahn, Yongin (KR); Jin-Han Park, Yongin (KR); Dong-Sul Kim, Yongin (KR); Byung-Chul Lee, Yongin (KR)

(72) Inventors: Kyung-Hyun Ahn, Yongin (KR); Jin-Han Park, Yongin (KR); Dong-Sul Kim, Yongin (KR); Byung-Chul Lee, Yongin (KR)

(73) Assignee: Samsung Display Co., Ltd., Samsung-ro, Giheng-Gu, Yongin-si, Gyeonggi-Do (KR)

( * ) Notice: Subject to any disclaimer, the term of this patent is extended or adjusted under 35 U.S.C. 154(b) by 5 days.

(21) Appl. No.: 13/936,298

(22) Filed: Jul. 8, 2013

(65) Prior Publication Data

US 2014/0008022 A1  Jan. 9, 2014

(30) Foreign Application Priority Data

Jul. 9, 2012  (KR) .................. 10-2012-0074639

(51) Int. Cl.
*B32B 38/10* (2006.01)
*B29C 69/00* (2006.01)
*B32B 43/00* (2006.01)

(52) U.S. Cl.
CPC .............. *B29C 69/006* (2013.01); *B32B 38/10* (2013.01); *B32B 43/006* (2013.01); *B32B 2457/20* (2013.01); *Y10T 156/1132* (2015.01); *Y10T 156/1137* (2015.01); *Y10T 156/1174* (2015.01); *Y10T 156/195* (2015.01); *Y10T 156/1939* (2015.01); *Y10T 156/1956* (2015.01); *Y10T 156/1978* (2015.01)

(58) Field of Classification Search
CPC .... B32B 38/10; B32B 43/006; B32N 43/006; Y10T 156/1132; Y10T 156/1174; Y10T 156/1944; Y10T 156/1989; Y10T 156/1137; Y10T 56/1939; Y10T 56/195; Y10T 156/1978
USPC .................. 156/759, 764, 714, 715, 707, 756
See application file for complete search history.

(56) References Cited

U.S. PATENT DOCUMENTS

| 4,880,488 | A | * | 11/1989 | Matsuo et al. | ................ | 156/702 |
| 5,891,298 | A | * | 4/1999 | Kuroda et al. | ................ | 156/716 |
| 7,798,195 | B2 | * | 9/2010 | Kobayashi et al. | ........... | 156/758 |
| 8,052,824 | B2 | | 11/2011 | Kanazawa | | |
| 8,052,835 | B2 | * | 11/2011 | Merrill et al. | ................. | 156/707 |
| 8,110,069 | B2 | | 2/2012 | Garben | | |
| 8,142,595 | B2 | | 3/2012 | Kobayashi | | |

(Continued)

FOREIGN PATENT DOCUMENTS

| JP | 10-010751 | 1/1998 |
| JP | 2003-136595 | 5/2003 |

(Continued)

*Primary Examiner* — Philip Tucker
*Assistant Examiner* — Nickolas Harm
(74) *Attorney, Agent, or Firm* — Robert E. Bushnell, Esq.

(57) ABSTRACT

A delamination apparatus that includes a stage to which a lower support, an acceptor substrate disposed on the lower support, and a donor film laminated with the lower support along the edge of the acceptor substrate, interposing the acceptor substrate therebetween are mounted. The delamination apparatus further includes a first gripper disposed in an end side of the stage to move an end of the donor film to a direction far away from the acceptor substrate by gripping the end of the donor film; and a first peeling roll disposed on the donor film to support the donor film disposed between the acceptor substrate and the first gripper, and rotating itself to a direction of the first gripper.

20 Claims, 10 Drawing Sheets

(56) References Cited

U.S. PATENT DOCUMENTS

| | | | |
|---|---|---|---|
| 8,151,856 B2 | 4/2012 | Kawashima et al. | |
| 2001/0017189 A1* | 8/2001 | Tsujimoto et al. | 156/344 |
| 2007/0235131 A1* | 10/2007 | Tsujimoto et al. | 156/344 |
| 2008/0185100 A1* | 8/2008 | Jang et al. | 156/344 |
| 2009/0288760 A1* | 11/2009 | Garben | 156/230 |
| 2013/0048223 A1* | 2/2013 | Ahn | 156/718 |
| 2013/0186574 A1* | 7/2013 | Baker et al. | 156/707 |

FOREIGN PATENT DOCUMENTS

| | | |
|---|---|---|
| KR | 10-2002-0084485 | 11/2002 |
| KR | 10-2007-0112078 | 11/2007 |
| KR | 10-2008-0066759 | 7/2008 |

* cited by examiner

DELAMINATION APPARATUS AND INLINE THERMAL IMAGING SYSTEM

CLAIM OF PRIORITY

This application makes reference to, incorporates the same herein, and claims all benefits accruing under 35 U.S.C. §119 from an application earlier filed in the Korean Intellectual Property Office on the 9 Jul. 2012 and there duly assigned Ser. No. 10-2012-0074639.

BACKGROUND OF THE INVENTION

1. Field of the Invention

The present invention generally relates to a delamination apparatus and an inline thermal imaging system including the same.

2. Description of the Related Art

An organic light emitting element is a flat display device. Such an organic light emitting element may include an anode, a cathode, and at least organic emission layer interleaved between the anode and the cathode. The organic light emitting element has merits of a wide viewing angle and a superior contract as well as a fast response speed. Due to the merits of the organic light emitting element, the organic light emitting element has been receiving attention as the next generation display element.

The above information disclosed in this Related Art section is only for enhancement of understanding of the background of the invention and therefore it may contain information that does not form the prior art that is already known in this country to a person of ordinary skill in the art.

SUMMARY OF THE INVENTION

The present invention has been made in an effort to provide a delamination apparatus that can minimize a failure occurring during a delamination process used in a thermal imaging method, and an inline thermal imaging system including the same.

One aspect of the present invention provides a delamination apparatus including: a stage to which a lower support, an acceptor substrate disposed on the lower support, and a donor film laminated with the lower support along the edge of the acceptor substrate, interposing the acceptor substrate therebetween are mounted; a first gripper disposed in an end side of the stage to move an end of the donor to a direction far away from the acceptor substrate by gripping the end of the donor film; and a first peeling roll disposed on the donor film to support the donor film disposed between the acceptor substrate and the first gripper, and rotating itself to a direction of the first gripper.

The first peeling roll may include: a fixing shaft through which air passes, and including a first slit penetrated to a direction between the acceptor substrate and the first gripper from the inside of the fixing shaft; an external roll surrounding the fixing shaft, rotating itself with respect to the fixing shaft, and including a plurality of second slits disposed along an outer part and penetrated to a direction of the fixing shaft; and a barrier supported by the fixing shaft and disposed between the fixing shaft and the external roll, and opening a direction between the acceptor substrate and the first gripper.

The barrier may open a ¼ area of the entire outer part of the fixing shaft.

The air may move from the first slit to the second slit.

The air may move from the second slit to the first slit.

The first peeling roll may further include a cover surrounding the external roll.

The cover may include: a first sub-cover disposed corresponding to the end of the donor film and blocking the second slit; a second sub-cover disposed adjacent to the first sub-cover corresponding to a portion of the donor film laminated with the lower support, and including a plurality of first penetration holes; and a third sub-cover disposed adjacent to the second sub-cover corresponding to the acceptor substrate and including a plurality of second penetration holes that are smaller than the first penetration holes in size.

The delamination apparatus may further include a first support roll disposed opposite to the first peeling roll, interposing the donor film therebetween.

The delamination apparatus may further include: a second gripper disposed in an end side of the stage to grip an end of the lower support, and moving the end of the lower support to a direction far away from the acceptor substrate; and a second peeling roll disposed on the lower support to support the lower support disposed between the acceptor substrate and the second gripper, and rotating itself to a direction of the second gripper.

The delamination apparatus may further include a second support roll disposed opposite to the second peeling roll, interposing the lower support therebetween.

Another aspect of the present invention provides an inline thermal imaging system including: the delamination apparatus as described above; a transferring apparatus neighboring the delamination apparatus, and including a laser unit irradiating laser beams to the donor film corresponding to the acceptor substrate; a lamination apparatus neighboring the transferring apparatus, and including a lamination unit laminating the donor film to the lower support, interposing the acceptor substrate therebetween; and a stage movement apparatus respectively moving the stage to the lamination apparatus, the transferring apparatus, and the delamination apparatus.

According to the exemplary embodiments of the present invention, a delamination apparatus and an inline thermal imaging system having the same may minimize defect generated during a delamination process using a thermal imaging method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

For various exemplary embodiments, constituent elements having the same constitution are designated to the same reference numerals and explained representatively in the first exemplary embodiment. In the other exemplary embodiments, only the constituent elements different from in the first exemplary embodiment are described.

In drawings, a size and a thickness of each element is approximately shown for better understanding and ease of description. Therefore, the present invention is not limited to the drawings.

In the drawings, the thickness of layers, films, panels, regions, etc., are exaggerated for clarity. In drawings, a size and a thickness of each element are exaggerated for better understanding and ease of description. It will be understood that when an element such as a layer, film, region, or substrate is referred to as being "on" another element, it can be directly on the other element or intervening elements may also be present.

In addition, unless explicitly described to the contrary, the word "comprise" and variations such as "comprises" or "comprising" will be understood to imply the inclusion of stated elements but not the exclusion of any other elements. It will be understood that when an element such as a layer, film, region, or substrate is referred to as being "on" another element, it can be on the other element or under the other element. The element may not be on another element in a gravity direction.

Generally, an organic light emitting element may include at least one of organic layers interleaved among a hole injection layer (HIL), a hole transport layer (ETL), and an electron injection layer (EIL) according to whether an emission layer is made of a high molecular organic material or a low molecular organic material besides an organic emission layer.

In such an organic light emitting element, an organic layer may be required to be patterned in order to realize full color. A low molecular organic light emitting element may be patterned using a shadow mask, and a high molecular organic light emitting element may be patterned through an ink-jet printing method and a laser induced thermal imaging (LITI) method using laser. The LITI method may be advantageous because the LITI method can pattern a large area of an organic layer. Furthermore, the LITI method can pattern an organic layer with high precision and with high resolution.

Hereinafter, an inline thermal imaging system according to a first exemplary embodiment of the present invention will be described with reference to FIG. 1 to FIG. 13.

Figure 1:
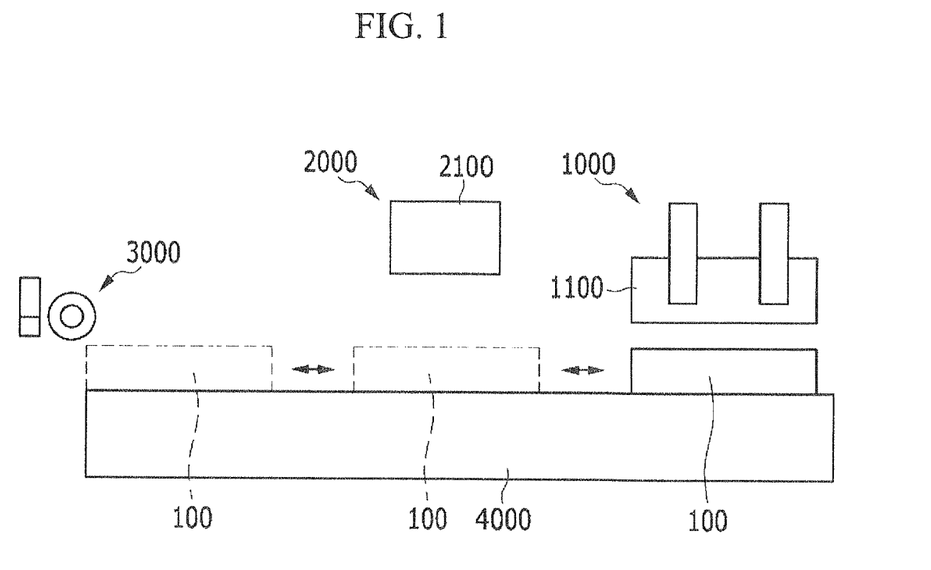
FIG. 1 shows an inline thermal imaging system according to a first exemplary embodiment of the present invention.

FIG. 1 shows an inline thermal imaging system according to the first exemplary embodiment of the present invention.

As shown in FIG. 1, the inline thermal imaging system according to the first exemplary embodiment of the present invention is an inline system that laminates a donor film to an acceptor substrate, transfers an organic layer formed in the donor film by irradiating laser beams, and delaminates the donor film from the acceptor substrate, and includes a lamination apparatus 1000, a transferring apparatus 2000, a delamination apparatus 3000, and a stage moving apparatus 4000. The stage moving apparatus 4000 moves stages 100 to which the acceptor substrate may be mounted respectively to the lamination apparatus 1000, the transferring apparatus 2000, and the delamination apparatus 3000, and may includes a moving means such as a rail and the like and a driving means such as a motor and the like to drive the moving means. The stages 100 moved by the stage moving apparatus 4000 are respectively included in the lamination apparatus 1000, the transferring apparatus 2000, and the delamination apparatus 3000.

Figure 2:
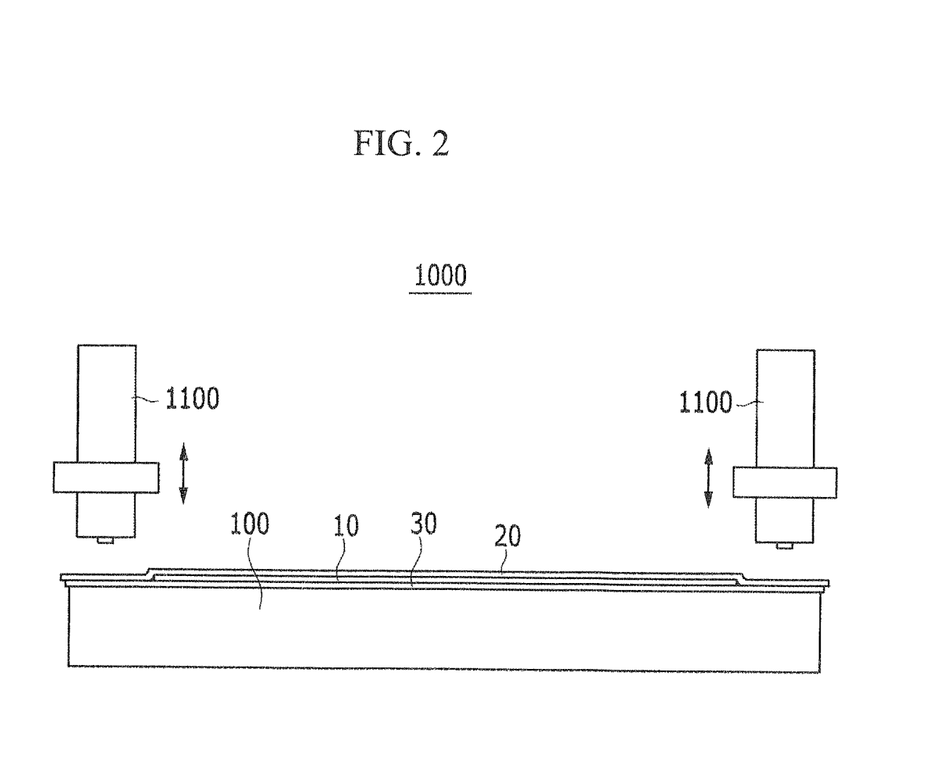
FIG. 2 shows a lamination apparatus shown in FIG. 1.

FIG. 2 shows the lamination apparatus shown in FIG. 1.

As shown in FIG. 2, the lamination apparatus 1000 is an apparatus for laminating the donor film 20 to the acceptor substrate 10, and includes the stage 100 and a lamination unit 1100.

A lower support 30 formed in the shape of a film, an acceptor substrate 10 disposed on the lower support 30, and the donor film 20 laminated with the lower support 30 along the edge of the acceptor substrate 10, interposing the acceptor substrate 10 are mounted to the stage 100. The stage 100 may includes a stage align key that corresponds to an align key formed in the acceptor substrate 10.

The lamination unit 1100 may be movable to up and down with respect to the stage 100 and maintains an area where the acceptor substrate 10 may be located in a vacuum state, and then adheres the donor film 20 and the lower support 30 using heat and the like along the edge of the acceptor substrate 10 of the stage 100. Accordingly, the lower support 30 and the donor film 20 are laminated, interposing the acceptor substrate 10 therebetween, and the acceptor substrate 10 may be sealed between the donor film 20 and the lower support 30. Here, the lower support 30 may be disposed between the stage 100 and the acceptor substrate 10 and between the stage 100 and the donor film 20.

In the first exemplary embodiment of the present invention, the lower support 30 may be disposed between the stage 100 and the acceptor substrate 10 and between the stage 100 and the donor film 20, but when a lower support 30 is omitted in another exemplary embodiment of the present invention, a donor film 20 may be directly bonded with a stage 100 along the edge of an acceptor substrate 10.

Hereinafter, the acceptor substrate 10 laminated with the donor film 20 will be described.

Figure 3:
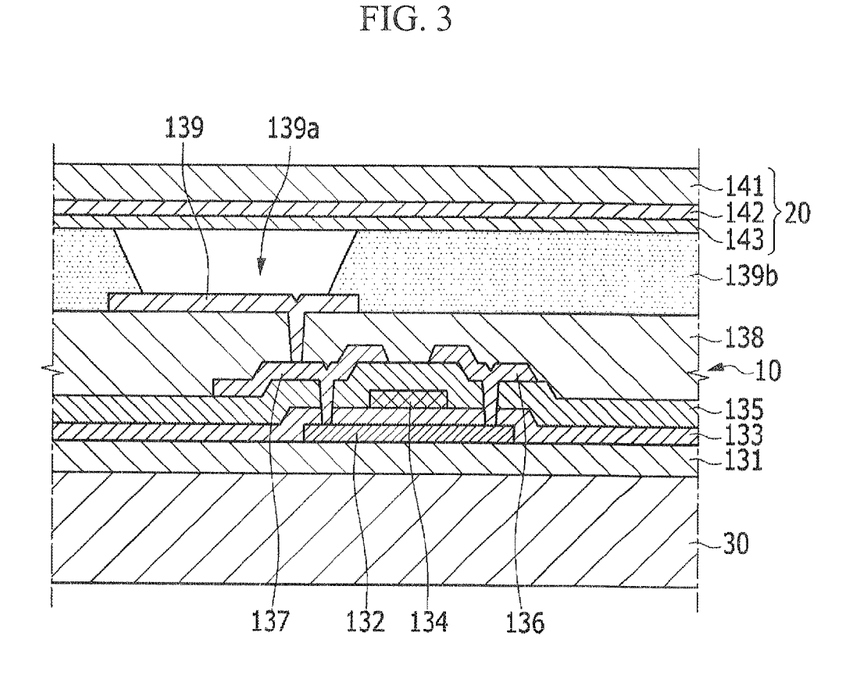
FIG. 3 is a cross-sectional view of an accepter substrate laminated with a donor film using the lamination apparatus shown in FIG. 2.

FIG. 3 is a cross-sectional view of the acceptor substrate laminated with the donor film using the lamination apparatus shown in FIG. 2.

As shown in FIG. 3, in the acceptor substrate 10, a semiconductor layer 132 may be disposed in a predetermined area on a substrate 131. The semiconductor layer 132 may be an amorphous silicon layer or a polysilicon layer crystallized from the amorphous silicon layer. A gate insulating layer 133 that is a first insulating layer may be disposed on the semiconductor layer 132. A gate electrode 134 overlapping the semiconductor layer 132 may be disposed on the gate insulating layer 133. A second insulating layer 135 covering the semiconductor layer 132 and the gate electrode 134 may be disposed on the gate electrode 134. A source electrode 136 and a drain electrode 137 respectively connecting lateral ends of the semiconductor layer 132 penetrating the second insulating layer 135 and the first insulating layer 133 are disposed on the second insulating layer 135. The semiconductor layer 132, the gate electrode 134, and the source/drain electrodes 136 and 137 form a thin film transistor T. A third insulating layer 138 covering the source/drain electrodes 136 and 137 may be disposed on the source/drain electrodes 136 and 137. The third insulating layer 138 may be a passivation layer for protecting the thin film transistor T and/or a planarization layer for reducing a step difference due to the thin film transistor. A pixel electrode 139 connected with the drain electrode 137 may be disposed on the third insulating layer 138 while penetrating the third insulating layer 138. The pixel electrode 139 may be, for example, an indium tin oxide (ITO) layer or an indium zinc oxide (TIO) layer. A pixel defining layer 139b having an opening that partially exposes the pixel electrode 139 may be disposed on the pixel electrode 139.

The donor film 20 laminated on the acceptor substrate 10 may include a base film 141, a light to heat conversion layer 142, and an organic layer 143. The light to heat conversion layer 142 and the organic layer 143 may be sequentially stacked on one side of the base film 141. The donor film 20 may have a predetermined elasticity. The based film 141 may be made of a transparent high molecular organic material such as polyethylene terephthalate (PET), Polyethylene naphthalate (PEN), polyethylene (PE), and polycarbonate (PC). The light to heat conversion layer 142 may convert an incident light, which is laser, to heat. The light to heat conversion layer 142 may include light absorption material such as aluminum oxide, aluminum sulfide, carbon black, graphite or infrared ray dye. The organic layer 143 may be at least one selected from the group consisting of a hole injection layer (HIL), a hole transport layer (HTL), an electro-luminescence layer, a hole suppress layer, an electron transport layer (ETL), and an electron injection layer (EIL).

Figure 4:
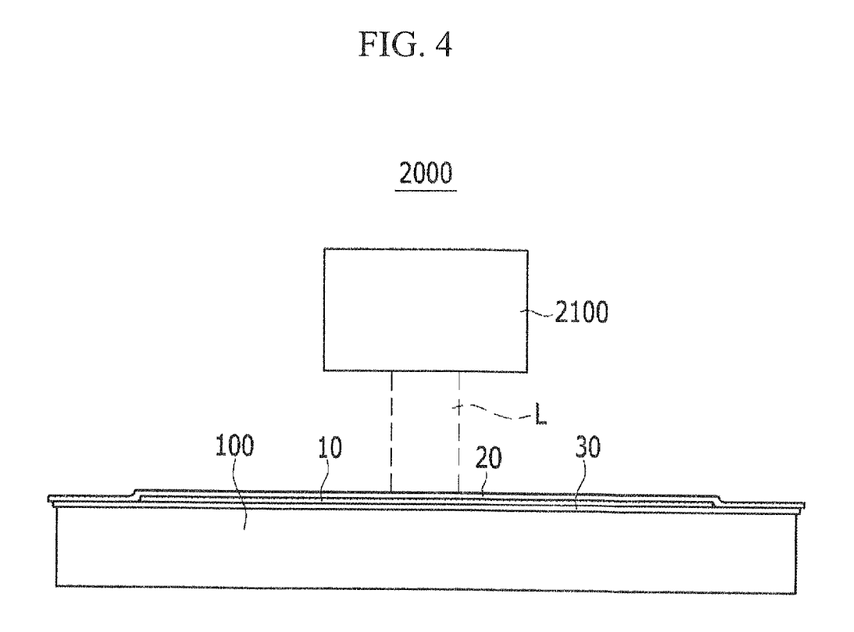
FIG. 4 shows the transferring apparatus shown in FIG. 1.

FIG. 4 illustrates a transferring apparatus of FIG. 1.

As shown in FIG. 4, the transferring apparatus 2000 may be disposed between the lamination apparatus 1000 and the delamination apparatus 3000. The transferring apparatus 2000 may transport an organic layer of the donor film 20 laminated at the acceptor substrate 10 on the acceptor substrate 10. The transport apparatus 2000 may include a stage 100 and a laser unit 2100.

The laser unit 2100 may radiate laser L at the donor film 20 corresponding to a substrate area SA of the stage 100. Due to the laser L, the organic layer 143 formed on the donor film 20 may be transferred to the acceptor substrate 10. The laser L may be radiated to the donor film 20 corresponding to an opening 139a of the acceptor substrate 10.

The transferring apparatus 2000 may include a thermal imaging unit instead of the laser unit 2100, and in this case, the thermal imaging unit may transfer the organic layer 143 formed in the donor film 20 to the acceptor substrate 10 by applying heat to the donor film 20.

Hereinafter, the acceptor substrate 10 where the organic layer 143 of the donor film 20 may be transferred will be described.

Figure 5:
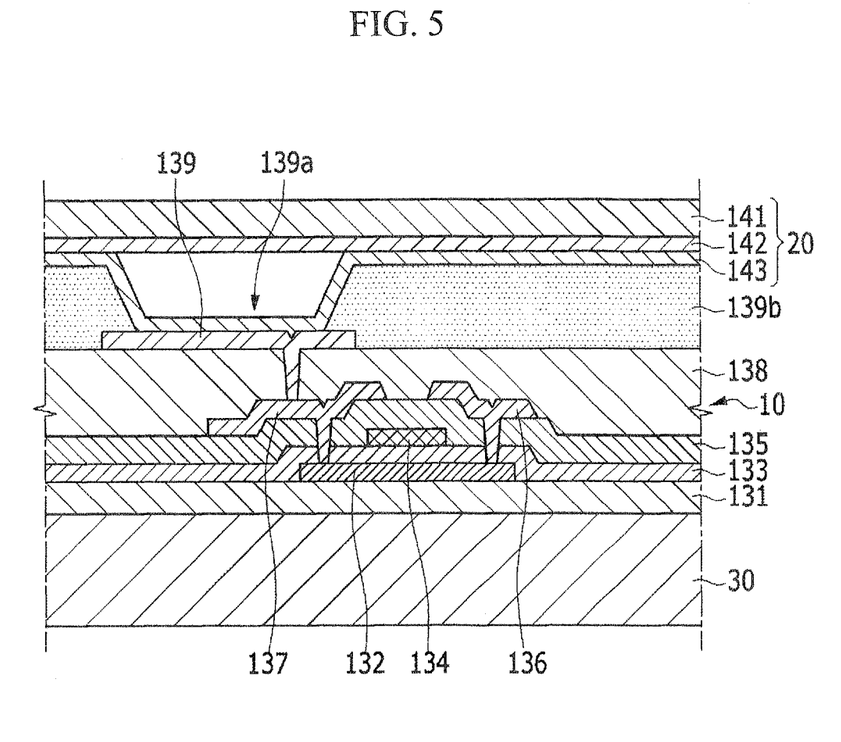
FIG. 5 is a cross-sectional view of an accepter substrate to which an organic layer of the donor film is transferred using the transferring apparatus shown in FIG. 4.

FIG. 5 is a cross-sectional view illustrating an acceptor substrate having an organic layer of a donor film transferred using a transport apparatus of FIG. 4.

As shown in FIG. 5, the organic layer 143 may be transferred to the acceptor substrate 10 corresponding to an opening 139a of the acceptor substrate 10.

Figure 6:
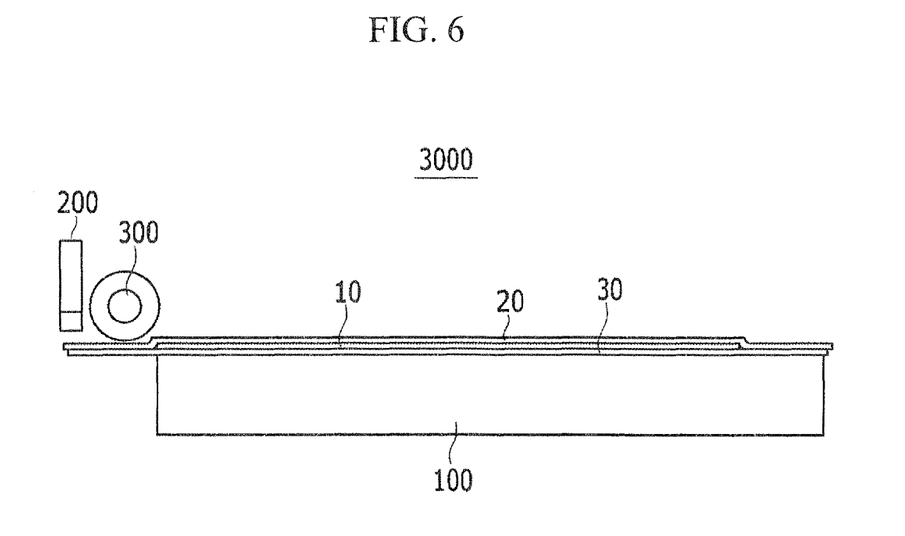
FIG. 6 through FIG. 8 illustrate a delamination apparatus shown in FIG. 1.
Figure 7:
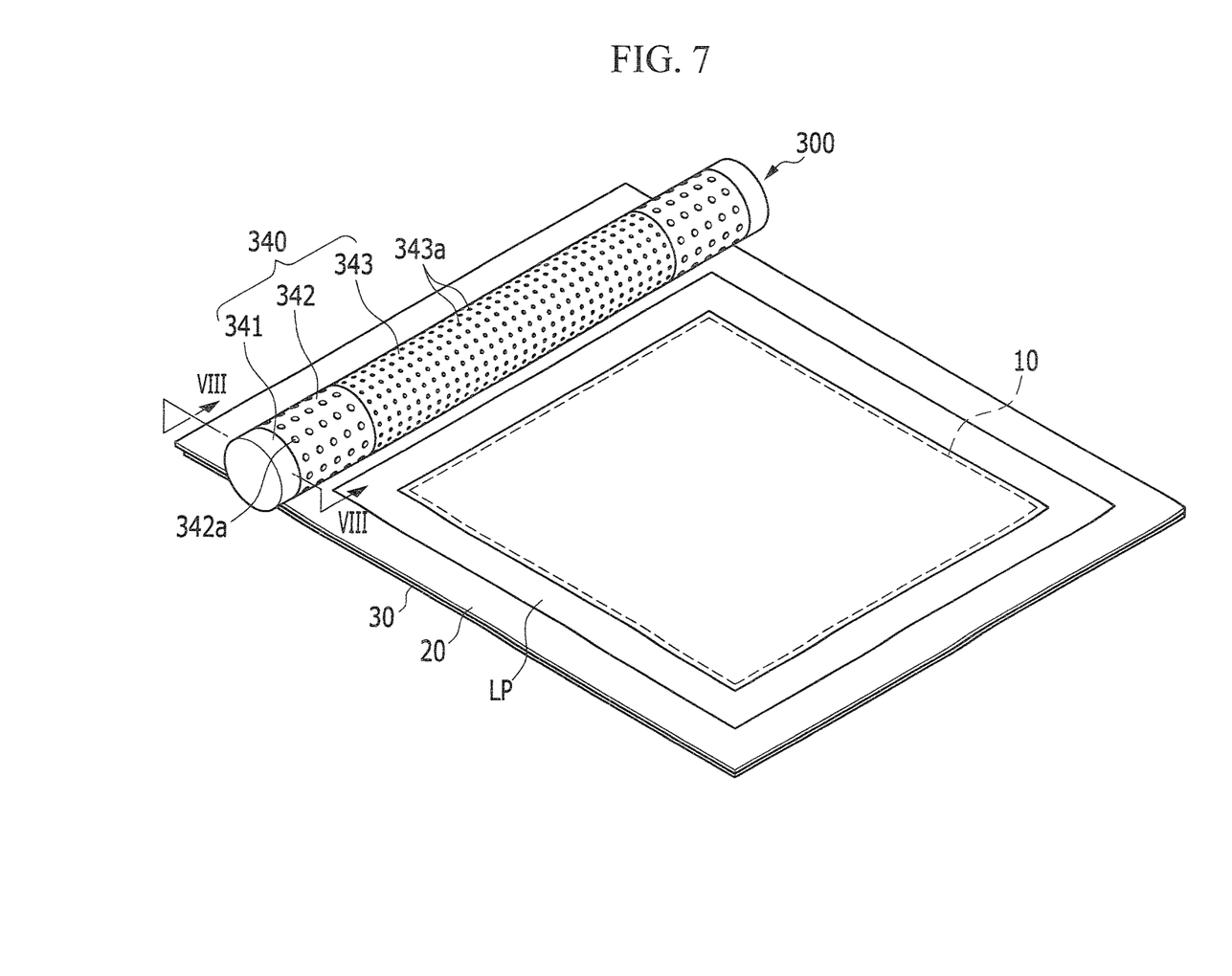
Figure 8:
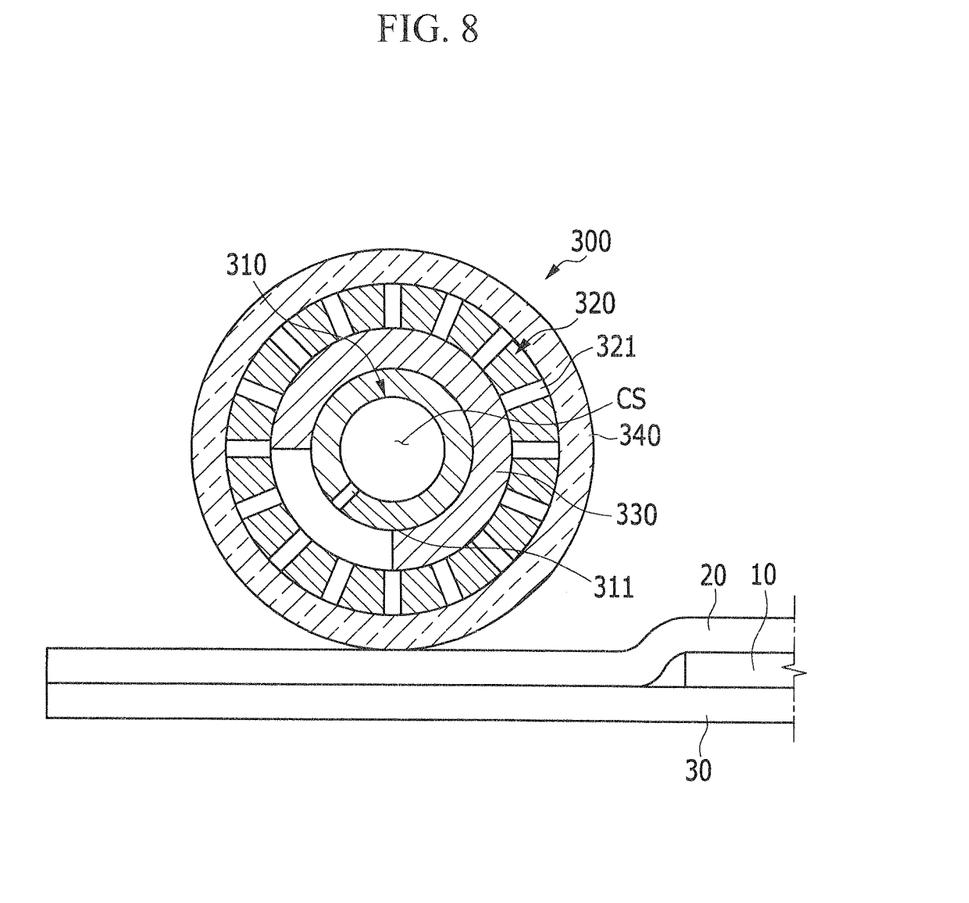

FIG. 6 to FIG. 8 illustrate a delamination apparatus of FIG. 1.

As shown in FIG. 6, the delamination apparatus 3000 may be adjacent to the transferring apparatus 2000. The delamination apparatus 3000 delaminates the donor film 20 from the acceptor substrate 10 where the organic layer 143 may be transferred. The delamination apparatus 3000 includes a stage 100, a first gripper 200, and a first peeling roll 300.

The first gripper 200 may be disposed in an end side of the stage 100, and grips the end of the donor film 20. The first gripper 200 moves the donor film 20 to a direction far away from the acceptor substrate 10, for example, an upper side by gripping the end of the donor film 20 to separate the end of the donor film 20 from the lower support 30. When the first gripper 200 separates the end of the donor film 20 from the lower support 30, the donor film 20 contacts the first peeling roll 300.

FIG. 7 shows the first peeling roll, the lower support, the acceptor substrtae, and the donor film shown in FIG. 6. FIG. 8 is a cross-sectional view of FIG. 7, taken along the line VIII-VIII.

As shown in FIG. 6 to FIG. 8, the first peeling roll 300 may be disposed on the donor film 20. The first peeling roll 300 supports the donor film 20 disposed between the acceptor substrate 10 and the first gripper 200. Here, the supporting of the donor film 20 implies suction or blowing the donor film 20.

The first peeling roll 300 rotates itself to a direction of the first gripper 200. For example, the first peeling roll 300 rotates in a clockwise direction to delaminate the donor 20 from the lower support 30.

The first peeling roll 300 includes a fixing shaft 310, an external roll 320, a barrier 330, and a cover 340.

The fixing shaft 310 includes a connection space CS through which air such as nitrogen (N) or oxygen (O) and a first slit 311 penetrated to a direction between the acceptor substrate 10 and the first gripper 200 from the inside of the connection space CS. The fixing shaft 310 may be disposed in the fixed stated on the donor film 20, and does not rotate.

An external roll 320 surrounds the fixing shaft 310, and rotates with respect to the fixing shaft 310. The external roll 320 includes a plurality of second slits 321 disposed along the outer part and penetrated to the fixing shaft 310. A bearing may be provided between the external roll 320 and the fixing shaft 310, and the first peeling roll 300 rotates by itself as the external roll 320 rotates by itself.

The barrier 330 supported by the fixing shaft 310 may be disposed between the fixing shaft 310 and the external roll 320, and opens a direction between the acceptor substrate 10 and the first gripper 200. The barrier 330 opens a ¼ area of the entire area surrounding the outer part of the fixing shaft 310. For example, the barrier 330 opens an area rotated 90 degrees from a direction that may be perpendicular to the plate surface of the donor film 20.

The air passes through the connection space CS may move to a direction of the first slit 311 direction from the second slit 321 or may move to a direction of the second slit 321 from the first slit 311. When the air passing through the connection space CS moves to the first slit 311 direction from the second slit 321, the first peeling roll 300 sucks the donor film 20 disposed between the acceptor substrate 10 and the first gripper 200 to support the donor film 20 disposed between the acceptor substrate 10 and the first gripper 200. In addition, when the air passing through the connection space CS moves to the second slit 321 direction from the first slit 311, the first peeling roll 300 forms an air layer between the first peeling roll 300 and the donor film 20 by blowing the donor film 20 disposed between the acceptor substrate 10 and the first gripper 200 to support the donor film 20 disposed between the acceptor substrate 10 and the first gripper 200.

The cover 340 surrounds the external roll 320, and includes first sub-cover 341, a second sub-cover 342, and a third sub-cover 343.

The first sub-cover 341 may be disposed corresponding to an end of the donor film 20 and blocks the second slit 321 of the external roll 320.

The second sub-cover 342 may be adjacent to the first sub-cover 341 and disposed corresponding to a portion LP of the donor film 20 laminated with the lower support 30. The second sub-cover 342 includes a plurality of first penetration holes 342a formed along the outer part. The air passing through the connection space CS of the fixing shaft 310 passes through the first slit 311, the second slit 321, and the first penetration hole 342a.

The third sub-cover 343 may be adjacent to the second sub-cover 342 and disposed corresponding to the acceptor substrate 10. The third sub-cover 343 includes a plurality of second penetration holes 343a formed along the outer part. The second penetration hole 343a is formed smaller than the first penetration hole 342a in size. The air passed through the connection space CS of the fixing shaft 310 passes through the first slit 311, the second slit 321, and the second penetration hole 343a.

Hereinafter, a delamination process using the delamination apparatus 3000 will be described in further detail with reference to FIG. 9 through FIG. 12.

FIG. 9 to FIG. 12 are provided for description of a delamination process using the delamination apparatus of FIG. 6 to FIG. 8.

Figure 9:
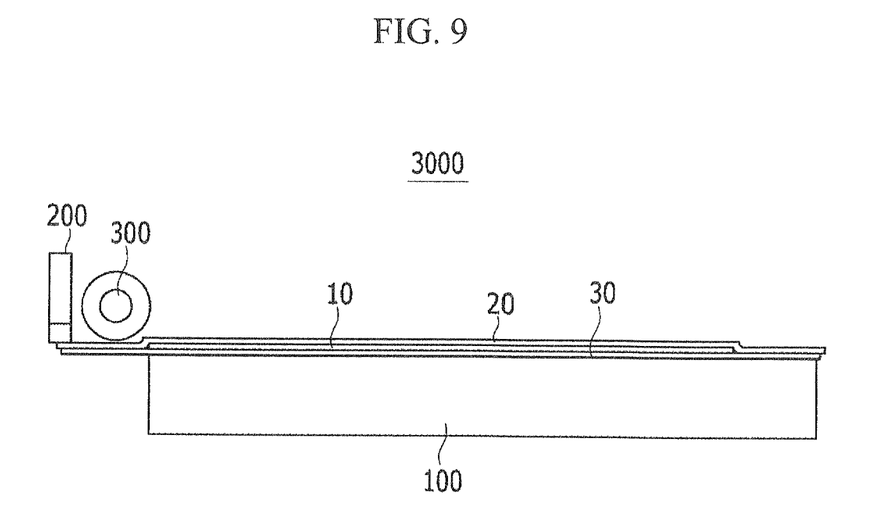
FIG. 9 through FIG. 12 are provided for description of a delamination process using the delamination apparatus shown in FIG. 8.

First, as shown in FIG. 9, the end of the donor film 20 may be gripped using the first gripper 200. In this case, the first peeling roll 300 may be disposed on the donor film 20, and may contact the donor film 20 or may be separated from the donor film 20.

Figure 10:
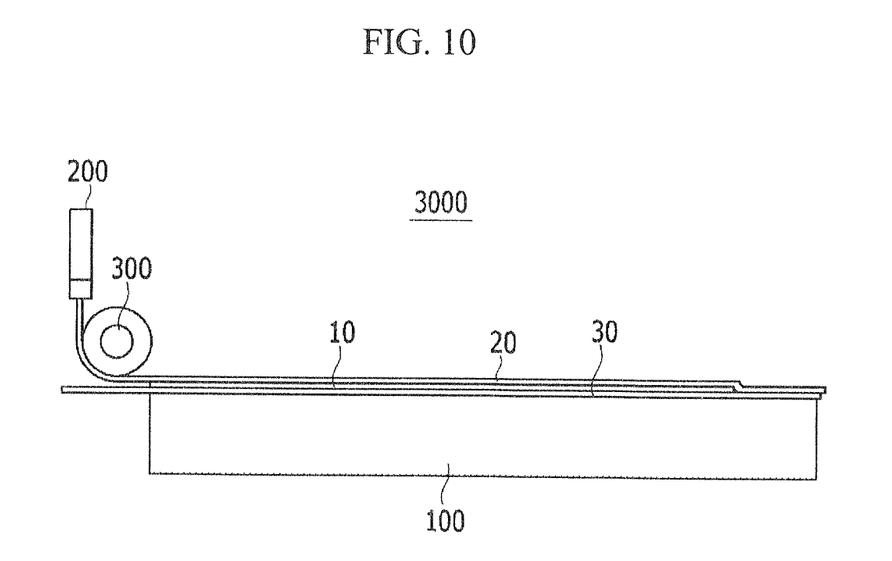

Next, as shown in FIG. 10, the first gripper 200 may be moved to an upper side to separate the end of the donor film 20 from the lower support 30 such that the donor film 20 may be supported by the first peeling roll 300.

Figure 11:
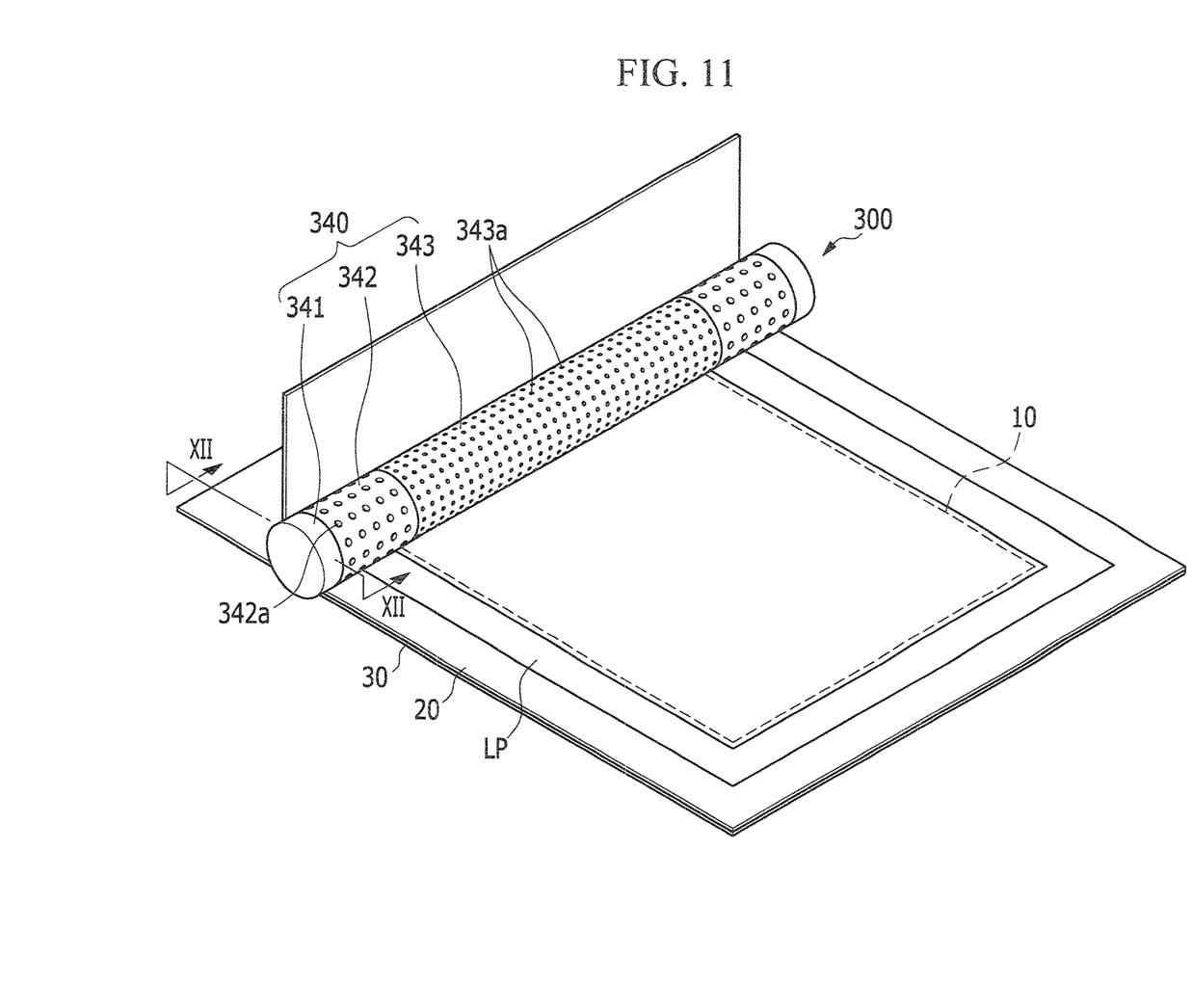
Figure 12:
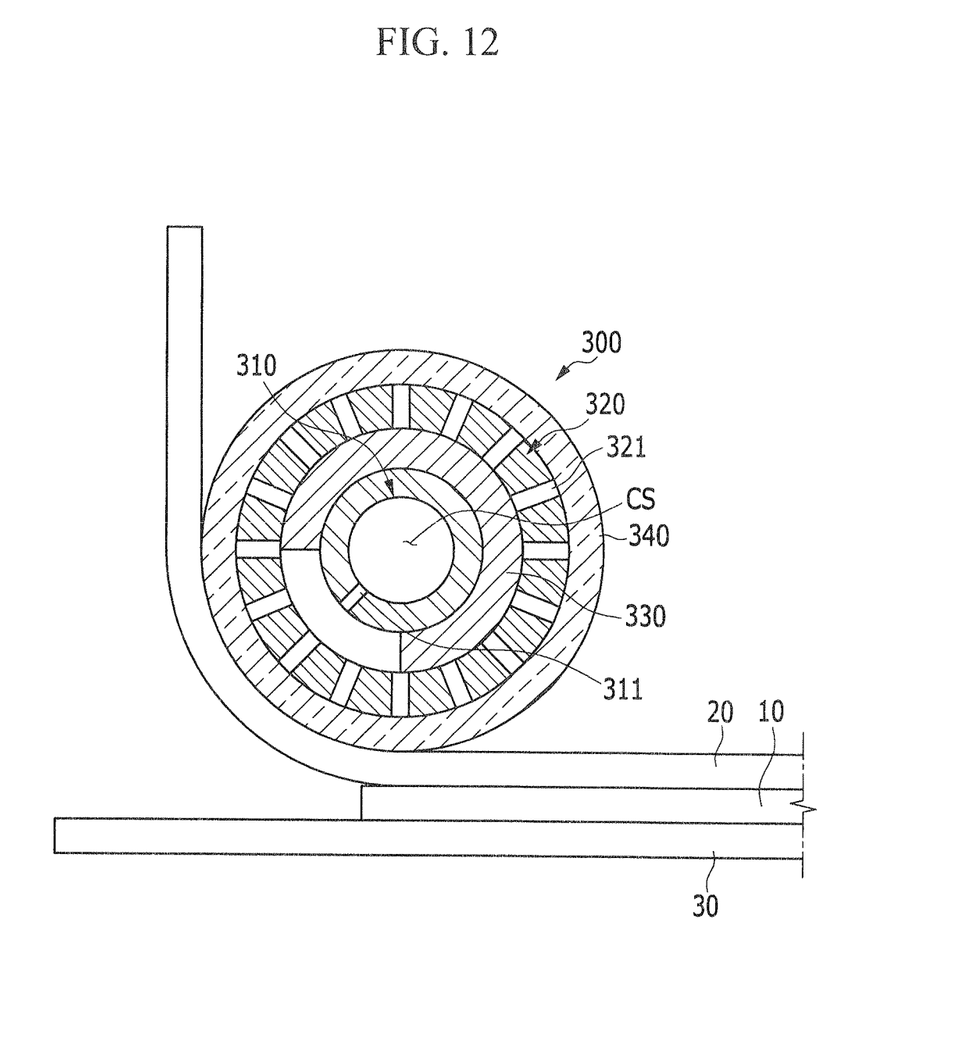

FIG. 11 shows the first peeling roll, the lower support, the acceptor substrate, and the donor film shown in FIG. 10. FIG. 12 is a cross-sectional view of FIG. 11, taken along the line XII-XII.

Next, as shown in FIG. 11 and FIG. 12, the first peeling roll 300 rotates itself and thus the donor film 20 may be delaminated from the lower support 30.

In further detail, since the air is sucked or blown to the direction between the acceptor substrate 10 and the first gripper 200 while the external roll 320 rotates with respect to the fixing shaft 310 that is in the fixed state, the first peeling roll 300 rotates itself while the donor film 20 disposed between the acceptor substrate 10 and the first gripper 200 is supported by the first peeling roll 300 so that the donor film 20 may be delaminated from the lower support 30.

In this case, the end of the donor film 20 may be pressed by the first sub-cover 341 corresponding to the first sub-cover 341 that blocks the second slit 321 of the external roll 320 so that the end of the donor film 20 can be prevented from being lifted due to suction or blowing of the first peeling roll 300. Thus, particles that can be generated due to separation of the donor film 20 from the lower support 30 or external air can be prevented from being penetrated into the acceptor substrate 10 disposed between the donor film 20 and the lower support 30.

In addition, since the portion LP of the donor film 20 laminated with the lower support 30 may be supported by the first peeling roll 300 corresponding to the second sub-cover 342 including the first penetrating hole 342a formed larger than the second penetrating hole 343a in size, suction or blowing is locally performed with high pressure so that the delamination from the lower support 30 can be easily performed.

In addition, the center area of the donor film 20 corresponding to the acceptor substrate 10 may be supported by the first peeling roll 300 corresponding to the third sub-cover 343 including the second penetration hole 343a formed smaller than the first penetration hole 342a so that suction or blowing is locally performed with low pressure, thereby suppressing a failure in the acceptor substrate 10 that may be occurred from delamination of the donor film 20 from the lower support 30.

As described, the first peeling roll 300 supports the donor film 20 disposed between the acceptor substrate 10 and the first gripper 200 rather than supporting the donor film 20 disposed between the acceptor substrate 10 and the first peeling roll 300 to delaminate the donor film 20 from the lower support 30, and accordingly a failure that may occur in the acceptor substrate 10 due suction or blowing of the first peeling roll 300 can be originally prevented.

Further, the first peeling roll 300 supports the donor film 20 by sucking or blowing the donor film 20 so that the donor film 20 can be prevented from being separated from the first peeling roll 300. This can be a factor for improvement of reliability of the entire delamination process.

Hereinafter, the acceptor substrate 10 through which the donor film 20 is delaminated will be described.

Figure 13:
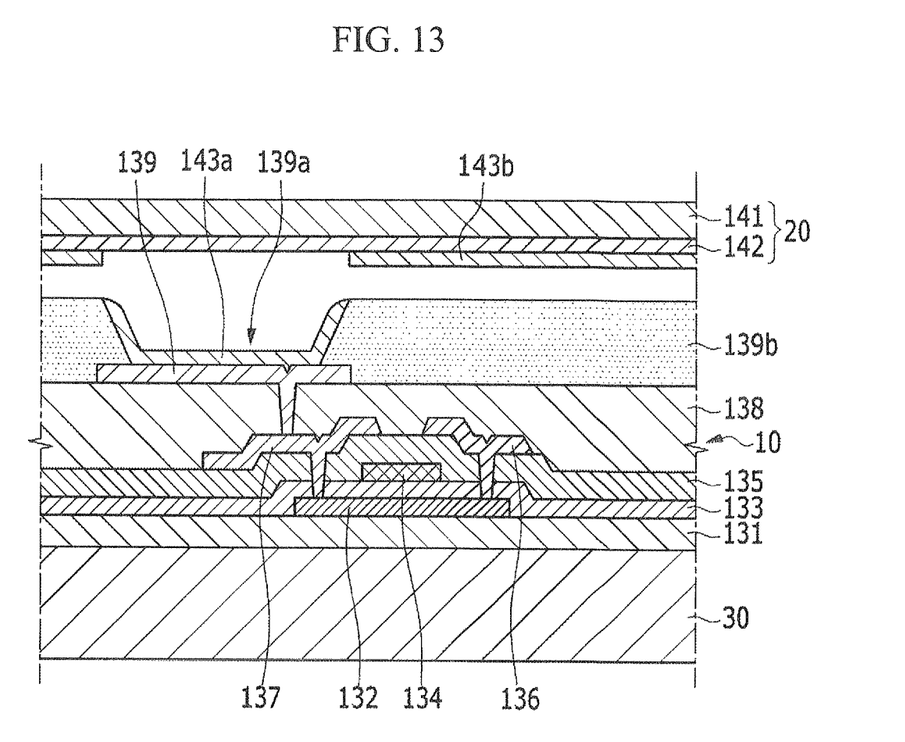
FIG. 13 is a cross-sectional view of an accepter substrate delaminated with a donor film through the delamination process shown in FIG. 9 to FIG. 12.

FIG. 13 is a cross-sectional view of the acceptor substrate from which the donor film may be delaminated through the delamination process shown in FIG. 9 to FIG. 12.

As shown in FIG. 13, since the donor film 20 may be separated from the acceptor substrate 10, an organic layer 143a transferred corresponding to the opening 139a of the acceptor substrate 10 may be separated from an organic layer 143b remaining in the donor film 20, and the organic layer 143a functions as a light emission means of an organic light emitting element.

As described above, the inline thermal imaging system according to the first exemplary embodiment of the present invention may include the lamination apparatus 1000, the transport apparatus 2000, and the delamination apparatus 3000, which share the stage 100. The inline thermal imaging system according to the first exemplary embodiment of the present invention may perform the lamination process, the imaging process, and the delamination process in an inline manner.

Furthermore, the inline thermal imaging system according to the first exemplary embodiment of the present invention perform the lamination process, the imaging process, and the delamination process using one stage 100. The lamination process, the imaging process, and the delamination process can be performed without the lower support 30 by directly attaching the donor film 20 at the stage 100 to seal the acceptor substrate 10. Accordingly, a manufacturing time and a manufacturing cost can be reduced.

Hereinafter, a delamination apparatus according to a second exemplary embodiment of the present invention will be described with reference to FIG. 14.

As compared to the delamination apparatus according to the first embodiment, only distinguishing elements of the delamination apparatus according to the second embodiment will be described. Since the remaining elements of the delamination apparatus according to the second embodiment have the similar configuration, the detailed description thereof will be omitted herein. For better comprehension and ease of description, identical constituent elements between the first embodiment and the second embodiment will be described using the same reference numerals.

Figure 14:
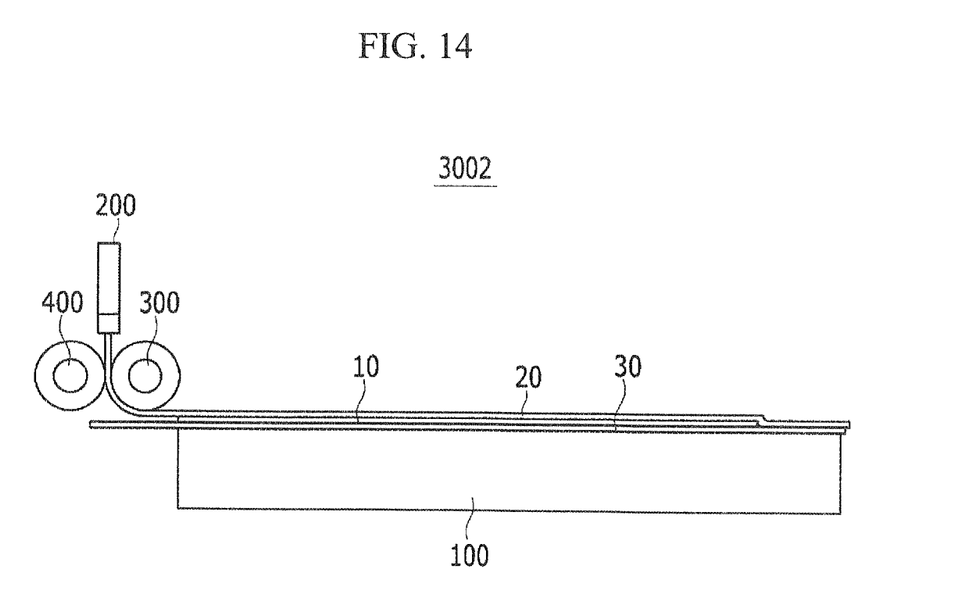
FIG. 14 shows a delamination apparatus according to a second exemplary embodiment of the present invention.

FIG. 14 illustrates a delamination apparatus in accordance with the second exemplary embodiment of the present invention.

As shown in FIG. 14, a delamination apparatus 3002 according to the second exemplary embodiment of the present invention further includes a first support roll 400.

The first support roll 400 may be disposed opposite to a first peeling roll 300, interposing a donor film 20 therebetween, and the donor film 20 may be supported between the first peeling roll 300 and the first support roll 400 when the donor film 20 may be delaminated from a lower support 30.

Like the first peeling roll 300 of the first exemplary embodiment, the first support roll 400 may include a fixing shaft, an external roll, a barrier, and a cover, and the fixing shaft, the external roll, the barrier, and the cover included in the first support roll 400 may be the same as the fixing shaft 310, the external roll 320, the barrier 330, and the cover 340 included in the first peeling roll 300.

As described, in the delamination apparatus 3002 according to the second exemplary embodiment of the present invention, the donor film 20 disposed between the acceptor substrate 10 and the first gripper 200 may be supported between the first peeling roll 300 and the first support roll 400 and thus delaminated from a lower support 30 so that a failure that may occur in the acceptor substrate 10 due to suction or blowing by the first peeling roll 300 and the first support roll 400 can be originally prevented.

Hereinafter, a delamination apparatus according to a third exemplary embodiment of the present invention will be described with reference to FIG. 15.

As compared to the delamination apparatus according to the first embodiment, only distinguishing elements of the delamination apparatus according to the third embodiment will be described. Since the remaining elements of the delamination apparatus according to the third embodiment have the similar configuration, the detailed description thereof will be omitted herein. For better comprehension and ease of description, identical constituent elements between the first embodiment and the third embodiment will be described using the same reference numerals.

Figure 15:
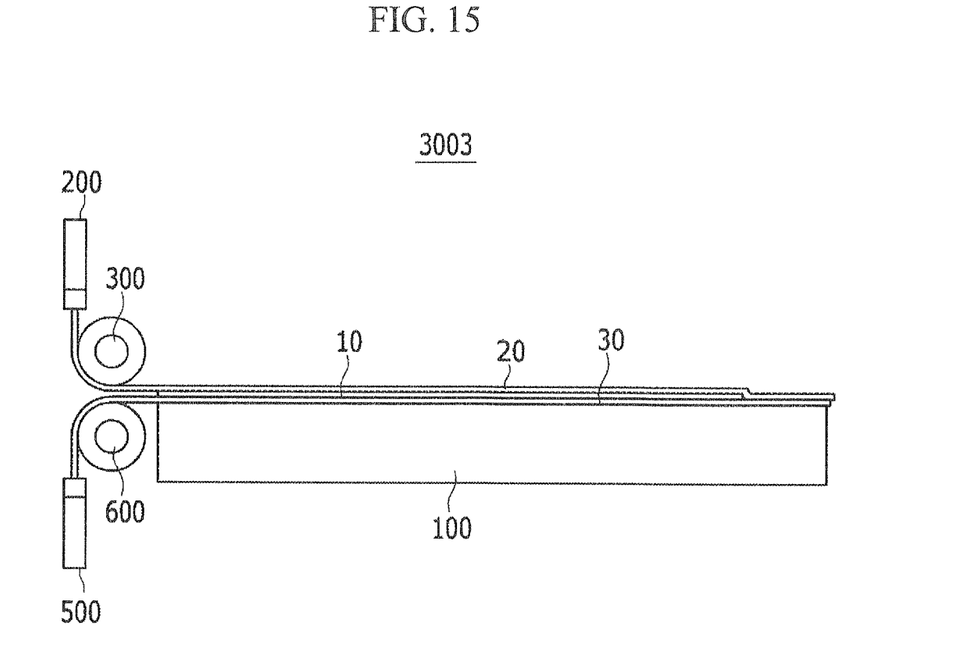
FIG. 15 shows a delamination apparatus according to a third exemplary embodiment of the present invention.

FIG. 15 shows a delamination apparatus according to the third exemplary embodiment of the present invention.

As shown in FIG. 15, a delamination apparatus 3003 according to the third exemplary embodiment of the present invention further includes a second gripper 500 and a second peeling roll 600.

The second gripper 500 may be disposed in an end side of a stage 100 to grip an end of a lower support 30. The second gripper 500 moves the end of the lower support 30 to a direction far away from an acceptor substrate 10, for example, to a lower side by gripping the end of the lower support 30 so that the end of the lower support 30 may be separated from the acceptor substrate 10. When the second gripper 500 separates the end of the lower support 30 from the acceptor substrate 10, the lower support 30 contacts the second peeling roll 600.

The second peeling roll 600 may be disposed on the lower support 30. The second peeling roll 600 supports the lower support 30 disposed between the acceptor substrate 10 and the second gripper 500. Here, the supporting the lower support 30 implies suction or blowing performed on the lower support 30.

The second peeling roll 600 rotates itself to a direction of the second gripper 500. For example, the second peeling roll 600 delaminates the lower support 30 from the donor film 20 by being rotated to the counterclockwise direction.

Like the first peeling roll 300, the second peeling roll 600 may include a fixing shaft, an external roll, a barrier, and a cover, and the fixing shaft, the external roll, the barrier, and the cover included in the second peeling roll 600 may be the same as the fixing shaft 310, the external roll 320, the barrier 330, and the cover 340 included in the first peeling roll 300.

As described above, in delamination apparatus 3003 according to the third exemplary embodiment of the present invention, the donor film 20 between the acceptor substrate 10 and the first gripper 200 may be supported by the first peeling roll 300 and thus being delaminated from the lower support 30, and at the same time, the lower support 30 between the acceptor substrate 10 and the second gripper 400 may be supported by the second peeling roll 600 and thus being delaminated from the donor film 20 so the a failure that may occur in the acceptor substrate 10 due to suction or blowing by the first peeling roll 300 and the second peeling roll 600 can be originally prevented.

Hereinafter, a delamination apparatus according to a fourth exemplary embodiment of the present invention will be described with reference to FIG. 16.

As compared to the delamination apparatus according to the first embodiment, only distinguishing elements of the delamination apparatus according to the fourth embodiment will be described. Since the remaining elements of the delamination apparatus according to the fourth embodiment have the similar configuration, the detailed description thereof will be omitted herein. For better comprehension and ease of description, identical constituent elements between the first embodiment and the fourth embodiment will be described using the same reference numerals.

Figure 16:
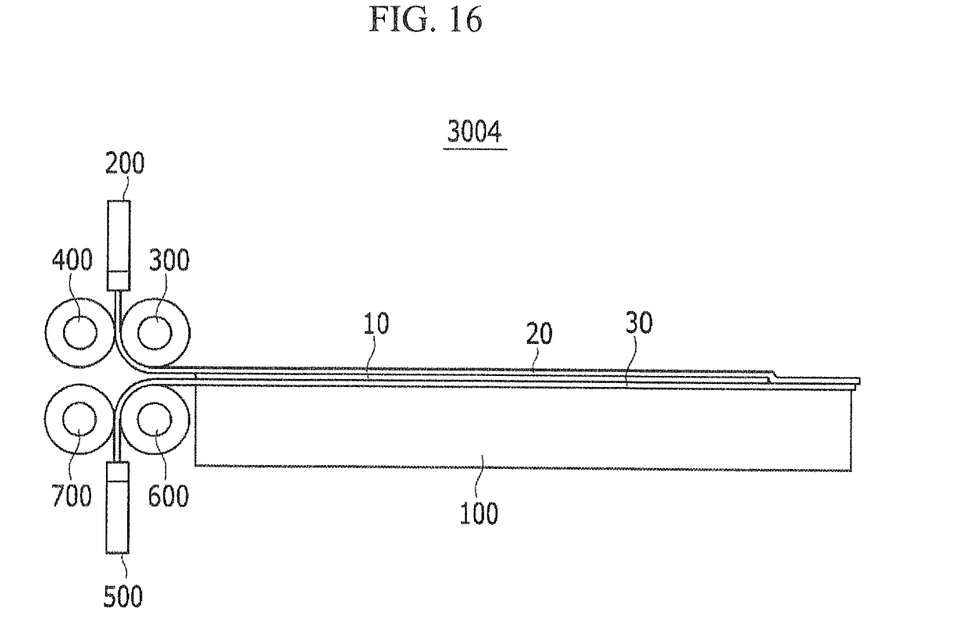
FIG. 16 shows a delamination apparatus according to a fourth exemplary embodiment of the present invention.

FIG. 16 shows the delamination apparatus according to the fourth exemplary embodiment of the present invention.

As shown in FIG. 16, a delamination apparatus 3004 according to the fourth exemplary embodiment of the present invention further includes a first support roll 400, a second gripper 500, a second peeling roll 600, and a second support roll 700.

The first support roll 400 may be disposed opposite to a first peeling roll 300, interposing a donor film 20 therebetween, and the donor film 20 may be supported between the first peeling roll 300 and the first support roll 400 when the donor film 20 may be delaminated from a lower support 30.

Like the first peeling roll 300, the first support roll 400 may include a fixing shaft, an external roll, a barrier, and a cover, and the fixing shaft, the external roll, the barrier, and the cover included in the first support roll 400 may be the same as the fixing shaft 310, the external roll 320, the barrier 330, and the cover 340 included in the first peeling roll 300.

The second gripper 500 may be disposed in an end side of a stage 100 to grip an end of the lower support 30. The second gripper 500 moves the end of the lower support 30 to a direction far away from an acceptor substrate 10, for example, to a lower side by gripping the end of the lower support 30 so that the end of the lower support 30 may be separated from the acceptor substrate 10. When the second gripper 500 separates the end of the lower support 30 from the acceptor substrate 10, the lower support 30 contacts the second peeling roll 600.

The second peeling roll 600 may be disposed on the lower support 30. The second peeling roll 600 supports the lower support 30 disposed between the acceptor substrate 10 and the second gripper 500. Here, the supporting the lower support 30 implies suction or blowing performed on the lower support 30.

The second peeling roll 600 rotates itself to a direction of the second gripper 500. For example, the second peeling roll 600 delaminates the lower support 30 from the donor film 20 by being rotated to the counterclockwise direction.

Like the first peeling roll 300, the second peeling roll 600 may include a fixing shaft, an external roll, a barrier, and a cover, and the fixing shaft, the external roll, the barrier, and the cover included in the second peeling roll 600 may be the same as the fixing shaft 310, the external roll 320, the barrier 330, and the cover 340 included in the first peeling roll 300.

The second support roll 700 may be disposed opposite to the second peeling roll 600, interposing the lower support 30 therebetween, and the lower support 30 may be supported between the second peeling roll 600 and the second support roll 700 when the lower support 30 may be delaminated from the donor film 20.

Like the first peeling roll 300, the second support roll 700 may include a fixing shaft, an external roll, a barrier, and a cover, and the fixing shaft, the external roll, the barrier, and the cover included in the second support roll 700 may be the same as the fixing shaft 310, the external roll 320, the barrier 330, and the cover 340 included in the first peeling roll 300.

As described, in the delamination apparatus 3004 according to the fourth exemplary embodiment of the present invention, the donor film 20 between the acceptor substrate 10 and the first gripper 200 may be supported between the first peeling roll 300 and the first support roll 400 and thus being delaminated from the lower support 30, and at the same time, the lower support 30 between the acceptor substrate 10 and the second gripper 500 may be supported between the second peeling roll 600 and the second support roll 700 and thus being delaminated from the donor film 20 so that a failure that may occur in the acceptor substrate 10 due to suction or blowing by the first peeling roll 300, the first support roll 400, the second peeling roll 600, and the second support roll 700 can be originally prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A delamination apparatus, comprising:
   a stage to which a lower support, an acceptor substrate disposed on the lower support, and a donor film laminated with the lower support along the edge of the acceptor substrate, interposing the acceptor substrate therebetween are mounted;
   a first gripper disposed in an end side of the stage to move an end of the donor film to a direction away from the acceptor substrate by gripping the end of the donor film; and
   a first peeling roll disposed on the donor film to support the donor film disposed between the acceptor substrate and the first gripper, and rotating itself to a direction of the first gripper, the first peeling roll comprises:
      a fixing shaft through which air passes, and including a first slit penetrated in the fixing shaft in a geometric plane between the acceptor substrate and the first gripper from the inside of the fixing shaft;
      an external roll surrounding the fixing shaft, rotating itself with respect to the fixing, shaft, and including a plurality of second slits disposed along an outer part and penetrated to as direction of the fixing, shaft; and
      a barrier supported by the fixing shaft and disposed between the fixing shaft and the external roll, and opening a direction between the acceptor substrate and the first gripper.

2. The delamination apparatus of claim 1, wherein the barrier opens approximately a ¼ area of an entire outer part of the fixing shaft.

3. The delamination apparatus of claim 1, wherein the air moves from the first slit to the second slit.

4. The delamination apparatus of claim 1, wherein the air moves from the second slit to the first slit.

5. The delamination apparatus of claim 1, wherein the first peeling roll further comprises a cover surrounding the external roll.

6. The delamination apparatus of claim 5, wherein the cover comprises:
   a first sub-cover disposed in a location corresponding to the end of the donor film and blocking the second slit;
   a second sub-cover disposed adjacent to the first sub-cover in a location corresponding to a portion of the donor film laminated with the lower support, and including a plurality of first penetration holes; and
   a third sub-cover disposed adjacent to the second sub-cover in a location corresponding to the acceptor substrate and including a plurality of second penetration holes that are smaller than the first penetration holes in size.

7. The delamination apparatus of claim 1, further comprising first support roll disposed opposite to the first peeling roll, interposing the donor film therebetween.

8. The delamination apparatus of claim 1, further comprising:
   a second gripper disposed in an end side of the stage to grip an end of the lower support, and moving the end of the lower support to a direction away from the acceptor substrate; and
   a second peeling roll disposed on the lower support to support the lower support disposed between the acceptor substrate and the second gripper, and rotating itself to a direction of the second gripper.

9. The delamination apparatus of claim 8, further comprising a second support roll disposed opposite to the second peeling roll, interposing the lower support therebetween.

10. An inline thermal imaging system, comprising:
    the delamination apparatus of claim 1;
    a transferring apparatus neighboring the delamination apparatus, and including a laser unit irradiating laser beams to the donor film in a location corresponding to the acceptor film;
    a lamination apparatus neighboring the transferring apparatus, and including a lamination unit laminating the donor film to the lower support, interposing the acceptor substrate therebetween.

11. The inline thermal imaging system of claim 10, wherein the first peeling roll comprises:
    a fixing shaft through which air passes, and including a first slit penetrated to a direction between the acceptor substrate and the first gripper from the inside of the fixing shaft;
    an external roll surrounding the fixing Shaft, rotating itself with respect to the fixing shaft, and including a plurality of second slits disposed along an outer part and penetrated to a direction of the fixing shaft; and a barrier supported by the fixing shaft and disposed between the fixing shaft and the external roll, and opening a direction between the acceptor substrate and the first gripper.

12. An inline thermal imaging system, comprising;
a delamination apparatus, comprising:
a stage to which a lower support, an acceptor substrate disposed on the lower support, and a donor film laminated with the lower support along the edge of the acceptor substrate, interposing the acceptor substrate therebetween are mounted;
a first gripper disposed in an end side of the stage to move an end of the donor film to a direction away from the acceptor substrate by gripping the end of the donor substrate; and
a first peeling roll disposed on the donor film to support the donor film disposed between the acceptor substrate and the first gripper, and rotating itself to a direction of the first gripper; said inline thermal imaging system, comprising:
a transferring apparatus neighboring the delamination apparatus, and including a laser unit irradiating laser beams to the donor film in a location corresponding to the acceptor film;
a lamination apparatus neighboring the transferring apparatus, and including as lamination unit laminating the donor film to the lower support, interposing the acceptor substrate therebetween; and
a stage movement apparatus respectively moving the stage to the lamination apparatus, the transferring apparatus, and the delamination apparatus, wherein the first peeling roll comprises:
  a fixing shaft through which air passes, and including a first slit penetrated to a direction between the acceptor substrate and the first gripper from the inside of the fixing shaft;
  an external roll surrounding the fixing shaft, rotating itself with respect to the fixing shaft, and including a plurality of second slits disposed along an outer part and penetrated to a direction of the fixing shaft; and
  a barrier supported by the fixing shaft and disposed between the fixing shaft and the external roll, and opening a direction between the acceptor substrate and the first gripper.

13. The inline thermal imaging system of claim 12, wherein the barrier opens approximately a ¼ area of an entire outer part of the fixing shaft.

14. The inline thermal imaging system of claim 12, wherein the air moves from the first slit to the second slit.

15. The inline thermal imaging system of claim 12, wherein the air moves from the second slit to the first slit.

16. The inline thermal imaging system of claim 12, wherein the first peeling roll further comprises a cover surrounding the external roll.

17. The inline thermal imaging system of claim 16, wherein the cover comprises:
a first sub-cover disposed in a location corresponding to the end of the donor film and blocking the second slit;
a second sub-cover disposed adjacent to the first sub-cover in a location corresponding to a portion of the donor film laminated with the lower support, and including a plurality of first penetration holes; and
a third sub-cover disposed adjacent to the second sub-cover in a location corresponding to the acceptor substrate and including a plurality of second penetration holes that are smaller than the first penetration holes in size.

18. The inline thermal imaging system of claim 12 further comprising a first support roll disposed opposite to the first peeling roll, interposing the donor film therebetween.

19. The inline thermal imaging system of claim 12, further comprising:
a second gripper disposed in an end side of the stage to grip an end of the lower support, and moving the end of the lower support to a direction far away from the acceptor substrate; and
a second peeling roll disposed on the lower support to support the lower support disposed between the acceptor substrate and the second gripper, and rotating itself to a direction of the second gripper.

20. The inline thermal imaging system of claim 19, further comprising a second support roll disposed opposite to the second peeling roll, interposing the lower support therebetween.

* * * * *